(12) United States Patent
Saathoff

(10) Patent No.: US 12,173,769 B1
(45) Date of Patent: Dec. 24, 2024

(54) VIBRATION REDUCING SYSTEM

(71) Applicant: LJ AVALON LLC, Tampa, FL (US)

(72) Inventor: Shawn D. Saathoff, Wesley Chapel, FL (US)

(73) Assignee: LJ Avalon LLC, Tampa, FL (US)

( * ) Notice: Subject to any disclaimer, the term of this patent is extended or adjusted under 35 U.S.C. 154(b) by 28 days.

(21) Appl. No.: 17/730,981

(22) Filed: Apr. 27, 2022

Related U.S. Application Data

(60) Provisional application No. 63/180,984, filed on Apr. 28, 2021.

(51) Int. Cl.
| | |
|---|---|
| *F16F 15/08* | (2006.01) |
| *E04B 1/82* | (2006.01) |
| *E04B 1/84* | (2006.01) |
| *F16B 5/02* | (2006.01) |
| *F16F 15/04* | (2006.01) |
| *E01F 8/00* | (2006.01) |

(52) U.S. Cl.
CPC ............ *F16F 15/046* (2013.01); *E04B 1/82* (2013.01); *E04B 1/84* (2013.01); *F16F 15/08* (2013.01); *E01F 8/00* (2013.01); *E04B 2001/8461* (2013.01)

(58) Field of Classification Search
CPC . F16F 15/046; F16F 15/08; F16F 1/37; F16B 5/02; E04B 1/84; E04B 1/82; E04B 2001/8461; E01F 8/00; E01F 8/0005
See application file for complete search history.

(56) References Cited

U.S. PATENT DOCUMENTS

| | | | | |
|---|---|---|---|---|
| 2,495,636 A | * | 1/1950 | Hoeltzel et al. .......... | E04B 1/88 156/92 |
| 2,497,912 A | * | 2/1950 | Rees .................... | E04B 1/8409 181/284 |
| 2,553,363 A | * | 5/1951 | Droeger ................ | E04B 1/86 52/145 |
| 2,694,025 A | * | 11/1954 | Slayter ................. | E04C 2/288 428/102 |
| 2,923,372 A | * | 2/1960 | MacCaferri .......... | E04B 1/8409 52/390 |
| 3,136,397 A | * | 6/1964 | Eckel .................... | E04F 19/06 52/471 |
| 3,622,194 A | * | 11/1971 | Bryk ................... | B60G 99/004 411/965 |
| 3,949,827 A | * | 4/1976 | Witherspoon ........ | E04B 2/7437 52/239 |
| 3,967,693 A | * | 7/1976 | Okawa ................ | G10K 11/16 52/145 |
| 4,113,053 A | * | 9/1978 | Matsumoto .......... | E01F 8/0076 181/284 |
| 4,160,491 A | * | 7/1979 | Matsumoto ......... | C04B 28/02 181/294 |

(Continued)

*Primary Examiner* — Thomas W Irvin
(74) *Attorney, Agent, or Firm* — Frijouf, Rust & Pyle P.A.

(57) ABSTRACT

A vibration reducing system for securing a first member to a second member is disclosed comprising a vibration mat spaces the first member from the second member and reduces vibration therebetween. A fastener secures the first member to the second member. A resilient member is interposed between the first member and the fastener for reducing vibration between the first member and the second member through the fastener.

14 Claims, 6 Drawing Sheets

(56) References Cited

U.S. PATENT DOCUMENTS

| | | | | |
|---|---|---|---|---|
| 4,207,964 A * | 6/1980 | Taguchi | E04B 1/99 | 428/33 |
| 4,248,325 A * | 2/1981 | Georgopoulos | B32B 7/12 | 181/290 |
| 4,306,631 A * | 12/1981 | Reusser | E01F 8/0035 | 256/73 |
| 4,402,384 A * | 9/1983 | Smith | E01F 8/0023 | 181/284 |
| 4,605,090 A * | 8/1986 | Melfi | E01F 8/0017 | 181/284 |
| 4,607,466 A * | 8/1986 | Allred | G10K 11/168 | 181/294 |
| 4,805,734 A * | 2/1989 | Mast | E01F 8/021 | 181/284 |
| 4,834,213 A * | 5/1989 | Yamamoto | E01D 19/06 | 181/290 |
| 5,217,771 A * | 6/1993 | Schmanski | E01F 8/0011 | 181/294 |
| 5,272,284 A * | 12/1993 | Schmanski | E01F 8/0023 | 181/290 |
| 6,328,513 B1 * | 12/2001 | Niwa | F16F 1/362 | 411/339 |
| 7,063,184 B1 * | 6/2006 | Johnson | G10K 11/162 | 181/290 |
| 7,503,428 B1 * | 3/2009 | Johnson | E04B 9/0485 | 181/290 |
| 8,186,119 B1 * | 5/2012 | Huff | F24F 3/0442 | 52/506.03 |
| 8,739,924 B2 * | 6/2014 | Johnson | E04B 9/0428 | 181/290 |
| 10,839,784 B1 * | 11/2020 | Johnson | B32B 15/082 | |
| 10,920,850 B2 * | 2/2021 | Kato | F16F 3/02 | |
| 11,131,334 B2 * | 9/2021 | Glauber | F16B 5/0241 | |
| 11,333,216 B2 * | 5/2022 | Kato | F02B 77/13 | |
| 11,668,368 B2 * | 6/2023 | Tada | F16F 1/362 | 188/381 |
| 11,707,926 B1 * | 7/2023 | Johnson | B32B 27/36 | 181/290 |
| 2018/0245614 A1 * | 8/2018 | Kato | F16F 15/06 | |
| 2018/0313378 A1 * | 11/2018 | Glauber | F16B 5/0241 | |
| 2022/0154802 A1 * | 5/2022 | Tada | F16F 15/06 | |

* cited by examiner

VIBRATION REDUCING SYSTEM

CROSS-REFERENCE TO RELATED APPLICATIONS

This application claims benefit of U.S. Patent Provisional Application No. 63/180,984 filed Apr. 28, 2021. All subject matter set forth in Provisional Application No. 63/180,984 is hereby incorporated by reference into the present application as if fully set forth herein.

BACKGROUND OF THE INVENTION

Field of the Invention

This invention relates to sound reduction and more particularly to an improved vibration reducing system for securing a first member to a second member with reducing vibration transmission such as mounting a building stud to another member.

Description of the Related Art

The prior art has known various types of devices and methods for reducing the level of sound within an environment. The various types of devices and methods of the prior art for reducing the level of sound within an environment included a diverse and variety of apparatuses and methods adapted for many as specific applications and uses.

One particular type of device for reducing the level of sound within an environment comprises the use of sound reducing panels and/or sound absorbing devices. Various types of sound reducing panels and sound absorbing devices have been incorporated by the prior art to reduce the level of sound and/or to selectively reduce or inhibit reflection of sound from reflective surfaces within an environment.

In some instances, the apparatuses and methods for reducing the level of sound within an environment selectively reduced the level of sound within an environment. Many of the apparatuses and methods for reducing the level of sound within an environment were specifically designed for providing enhancements for improving the acoustics within the environment, sound reducing panels and sound absorbing devices have been employed in very large rooms such as auditoriums as well as smaller rooms such as recording studios, home theaters and the like.

Other apparatuses and methods for reducing the level of sound within an environment of the prior art reduce the overall level of acoustic noise and/or sound and/or noise within the environment. In many cases, sound absorbing apparatuses and methods were used to reduce the sound of operating machinery as well as being used for reducing the transmission of sound and/or noise between the adjacent walls of a building.

The following U.S. Patents are representative of the attempts of the prior art to provide apparatuses and devices for reducing sound within an environment.

U.S. Pat. No. 2,495,636 to O. R. Hoeltzel et al. discloses a unit comprising a layer of loosely matted mass of fibrous material. A substantially impervious preformed and film of thermoplastic synthetic resin material is integralized with the fibers in one face of the loosely matted material. A fabric covering on the other face of the loosely matted layer is enfolded and is secured about the edges of the mass and the film. The mass, film and fabric are in the form of the sound proof flexible panel adapted to cover and soundproof a section of a wall.

U.S. Pat. No. 2,497,912 to W. M. Rees discloses an acoustic construction for the walls and ceilings of an enclosure comprising a sound absorbing layer overlying the wall and formed by a plurality of rectangles or tiles of fibrous material arranged in a plane. The edge of each of the tiles is contiguous to and slightly spaced from the edges of adjoining tiles. A renewable facing for the sound absorbing layer includes a plurality of thin sheets of porous material individual to the tiles. Each of the sheets having tabs at its edges integral with the sheets and resiliently held in place between adjacent edges of the tiles to hold the sheets in place over the face of the tiles.

U.S. Pat. No. 2,553,363 to C. C. Droeger discloses a non-combustible wall or ceiling of a plurality of parallel, latterly spaced, non-combustible primary furrings anchored thereon. Sound absorbent pads are arranged between adjacent pairs of furrings. A plurality of spaced, non-combustible secondary furrings extend extended transversely across the primary furrings and are secured thereto. Each of the secondary furrings comprise a portion lying in a plane parallel with the wall or ceiling and bridging between primary furrings and are provided with a multiplicity of perforations adapted to threadably receive threaded shanks of screws. A multi-perforate finish sheaths overlies the aforesaid parts.

U.S. Pat. No. 2,694,025 to G. Slayter et al. discloses a structural board comprising a core of glass fibers bounded into a porous self-sufficient layer. A layer of substantially inorganic cementitious material is integrated with at least one of the faces of the core. The cementitious layer is formed of a composition consisting essentially of an amide-aldehyde resin selected from the group consisting of urea formaldehyde and melamine formaldehyde and gypsum cement.

U.S. Pat. No. 2,923,372 to M. Maccaferri discloses an all plastic acoustic tile formed of a molded plastic material comprising a plate-like body having a rearwardly extending edge flange thereabout integral therewith. The body is formed to provide the front side thereof as a flat, planar face and having a multiplicity of apertures therethrough from the front face to and opening through the rear side all the body. Sound wave dampening tubes are molded integrally with the body projecting rearwardly from the rear side thereof. Each of the dampening tubes has a passage therethrough opening at the rear end thereof. Each of the dampening tubes is located on the rear side of the body in position with a body aperture opening into and forming the inlet to the passage of the dampening tube. The body has the rear side thereof formed with an annular recess therein about each of the dampening tubes providing a reduced thickness base portion of the body with which the tube is integrally joined.

U.S. Pat. No. 3,136,397 to O. C. Eckel discloses an assembly with two angular adjoining walls and a ceiling. The assembly comprises a plurality of panels with a first of the panels extending along the ceiling from the first wall. A second of the panels extends along the first wall below the ceiling panel. A Z-shaped retainer embodying one angular portion is attached to the first wall. Another angular portion extends laterally away from the wall indirectly below the first ceiling panel and above the second panel. And a third angular portion extends downwardly away from the ceiling panel. The ceiling first panel rests on the other angular portion of the retainer.

U.S. Pat. No. 3,949,827 to Witherspoon discloses an acoustical panel assembly having improved structural, decorative and acoustical properties. The panel assembly includes a perimeter frame. A thin septum member is supported in the center of the frame. A fibrous glass layer is positioned adjacent each side of the septum member. A molded, semi-rigid, fibrous glass diffuser member is positioned adjacent each of the fibrous glass layers. The assembly includes means for joining adjacent panel assemblies and, in one embodiment, an outer decorative fabric layer is positioned adjacent each of the outer surfaces of the diff-user members.

U.S. Pat. No. 3,967,693 to Okawa discloses a means and method for diminishing energy of sound. A corrugated cover having holes therethrough is mounted on a wall by ribs and an edge plate. The wall and edge plate together with the ribs and corrugated cover form a plurality of chambers, each cooperating with a plurality of the holes for diminishing the energy of impinging sound waves.

U.S. Pat. No. 4,113,053 to Matsumoto et al. discloses a sound absorbing body which can effectively be utilized as an exterior sound absorbing wall or an interior wall of a house. The sound absorbing body comprises a number of sound absorbing cavities inclined at an angle alpha which is smaller than 80 degrees with respect to a transverse horizontal sectional plane of the body. The sound absorbing cavities are opened at the sound incident surface.

U.S. Pat. No. 4,160,491 to Matsumoto et al. discloses a perlite sound absorbing plate and a sound insulating wall constructed by arranging a number of the plates side by side and by assembling together into one integral body. The plate is composed of a mixture including 1,000 cubic centimeters by bulk volume of formed perlite particles each having a diameter of 0.1 to 7.0 millimeters 100 to 140 grams of cement, liquid rubber latex containing 5 to 20 grams of solid ingredients and a suitable amount of water and produced by press molding with a compression ratio of 1.10 to 1.30. The wall is constructed by assembling a number of the plates each provided with a side groove with the aid of supporting columns and reinforcing plates, each having a ridge adapted to be engaged with the side groove of the plate.

U.S. Pat. No. 4,207,964 to Taguchi discloses a sound absorbing and diffusing unit provided for assembling an acoustic screen which can be placed or hung in front of a wall inside an acoustic room for improving a sound-effect therein. These units are detachably joined together with each other so that they may be easily separated and assembled again to form an acoustic screen having another shape or construction to adjust or modulate a sound-effect. A sound absorbing porous panel having a desired picture or pattern can be easily hung against a wall. The decorative panel can be reversely hung on the wall to provide another interior ornamentation. Accordingly, an acoustically correct room and a desired ornamentation on a wall inside the acoustic room can be easily obtained and changed without providing a rigid reverberating surface of the room.

U.S. Pat. No. 4,248,325 to Georgopoulos discloses an improved sound absorptive tackable space dividing wall panel or similar article in which a wire mesh screen is disposed within the sound absorptive material a distance from the tackable surface less than the length of the tack pin, thereby providing additional support for the tackable load without appreciably reducing the sound absorptive characteristics of the panel.

U.S. Pat. No. 4,306,631 to Reusser discloses a noise barrier or other type wall or building assembly including a plurality of spans each extending between spaced apart posts and having top and bottom girt affixed to the posts and in turn supporting a plurality or series of vertically disposed panels. Unique mating interlock elements integrally formed along both lateral edges of the wall or building exterior panels allow the sequential interconnection of all panels in a series by means of a rotating displacement of the individual panels to yield multilateral interlocking of the panels. The panel faces are configured to provide shadow texture, while masking of the posts and top girt in a free-standing type wall is obtained by a split cover assembly and split cap trim, respectively.

U.S. Pat. No. 4,402,384 to Smith et al. discloses a sound barrier system particularly suited for out-of-doors, ground-mounted installations, such as for a highway noise barrier comprising a vertical wall composed of successive individual wall sections arranged with immediately adjacent wall sections disposed at an intersecting angle to each other. Immediately adjacent wall sections are rigidly joined together in abutment along a common vertical joint. An earth anchor is anchored into the ground at each vertical joint. Each joint is secured to the corresponding earth anchor so that downwardly directed hold-down forces are applied by the earth anchors to the wall at the bottom portions of the joints.

U.S. Pat. No. 4,605,090 to Melfi discloses a post and panel type noise barrier fence formed of a plurality of concrete vertical posts or columns which have grooves to hold flat concrete panels between successive ones of the columns. The panels can have a stepped lower edge to accommodate elevational changes in the terrain. Also, certain of the columns have oppositely disposed recesses angled from each other so as to accommodate directional changes at the columns in the direction of the barrier fence.

U.S. Pat. No. 4,607,466 to Allred discloses an acoustic panel having a porous layer and a generally rigid layer affixed to each other. The generally rigid layer includes at least one passageway opening on one side of the rigid layer and extending through the rigid layer to the porous layer. The porous layer is a fibrous material. The rigid layer is a concrete-type material, such as vermiculite-cement plaster. This acoustic panel further comprises a generally rigid planar surface positioned adjacent to the porous layer. This generally rigid planar surface can comprise an insulating layer affixed to the other side of the porous layer and a structural layer fastened to the insulating layer. The insulating layer is a polyurethane foam board. The structural layer is a particle board.

U.S. Pat. No. 4,805,734 to Mast discloses an acoustic wall for streets and parks and for garden-like designs consisting of several substantially U-shaped frame members arranged at a distance from one another, which frame members are connected among one another and have mats applied on their front and side surfaces. In order to substantially reduce the manufacture on location, the duration of setting up and the greening time on location, the acoustic wall consists of individual elements of which each has several U-shaped frame members which are secured at the ends of their long legs on a base. The base forms a rigid frame with fastening means for a lift for the lifting and transporting of the acoustic wall. One or several narrow-mesh mats are secured on the base, which mats prevent a falling out of material filled into the acoustic wall during transport.

U.S. Pat. No. 4,834,213 to Yamamoto et al. discloses a noise silencer for highways adapted to be stuffed in a joint gap formed in a highway. It has a rectangular casing and padding enclosed in the casing. The casing is provided with a vent hole adapted to be closed by a plug. Before mounting the noise silencer, air is firstly sucked out from the silencer through the vent hole to flatten the padding and the vent hole is plugged. After the silencer has been mounted, the vent hole is open to inflate the padding so that the silencer will be pressed against the opposite walls of the joint gap.

U.S. Pat. No. 5,217,771 to Schmanski et al. discloses a device for preventing the transmission of sound, the device being fabricated of polymer composition and comprising a hollow core member formed of fiber-reinforced thermosetting resin, and at least an outer member formed of unreinforced thermoplastic resin which is friction fit to the core member. The core member and outer members are preferably formed by pultrusion and extrusion, respectively. Adjacently disposed devices are connected together to form a fence-like barrier through which few or no sound waves are allowed to pass. This system is advantageously used to prevent sound waves emanating from a large transportation structure such as a highway, railroad track, or airport.

U.S. Pat. No. 5,272,284 to Schmanski discloses a sound wall for placement along a roadside for reducing the transmission of sound from a traffic area wherein the sound wall comprises a plurality of stiff, resilient containment members respectfully configured with the channel configuration and having an enclosed channel volume and continuous open side. Each channel volume is filled with a composite composition of rubber chips and binder compressed within the channel and substantially filling the channel volume. These containment members are stacked in nesting relationship to form a wall structure, with the open side being oriented toward the traffic area.

In my prior invention set forth in U.S. Pat. No. 7,063,184 issued Jun. 20, 2006, 1 disclosed an apparatus and method of making a sound reducing panel for use in an outdoor or a hazardous environment. This invention was widely accepted in the industry as a significant improvement in sound reduction.

In my prior invention set forth in U.S. Pat. No. 10,839,784 issued Nov. 17, 2020, I disclosed an improve sound reducing panel with an aerogel layer for decoupling for reducing sonic vibration and for insulating the sound blocking material from fire and excessive heat.

It is an object of the present invention to add to my prior inventions and to provide a vibration reducing system for securing a first member to a second member with reducing vibration transmission.

It is another object of the present invention to provide a vibration reducing system vibration reducing system for securing a building stud to another member.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a vibration reducing system for securing a first member to a second member with reducing vibration transmission. A vibration mat spaces the first member from the second member and to reduced vibration therebetween. A fastener secures the first member to the second member. A resilient member is interposed between the first member and the fastener for reducing vibration between the first member and the second member through the fastener.

In another embodiment, the invention is incorporated into a vibration reducing system for securing a first member to a second member with reducing vibration transmission, the first member having a through orifice. The vibration reducing system comprises a vibration mat having a bore extending through the vibration mat. A resilient member extends between a first and second end. The resilient member is defined by a first diameter adjacent to the first end and having a second diameter adjacent to the second end of the resilient member. The first diameter is larger than the through orifice of the first member. The second diameter being smaller than the through orifice of the first member and having an axial length less than a thickness of the vibration mat. An aperture extends through the resilient member between the first and second ends of the resilient member. A rigid sleeve is disposed within the aperture extending from the first end passed the second end of the resilient member. The vibration mat being interposed between the first member and the second member with the bore being aligned with the orifice in the first member and the bore of the vibration mat. The resilient member being mounted upon the first member with the first diameter engaging the first member and with the second diameter being received within the through orifice of the first member. A fastener extends through the rigid sleeve for securing the first member to the second member with the rigid sleeve limiting the compression of the vibration mat and the resilient member by the fastener.

In a more specific example, the first member comprises a building component such as a building plate or a ceiling support. In one example, the first member comprises a metallic building stud. The second member comprises a member suitable for threadably receiving a threaded fastener.

In another specific example, the vibration mat comprises an aerogel layer. In addition, the vibration mat includes a high density foam layer and an aerogel layer. The resilient member comprises a neoprene member with a fender washer located on the first end of the resilient member. The rigid sleeve comprises a steel member.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
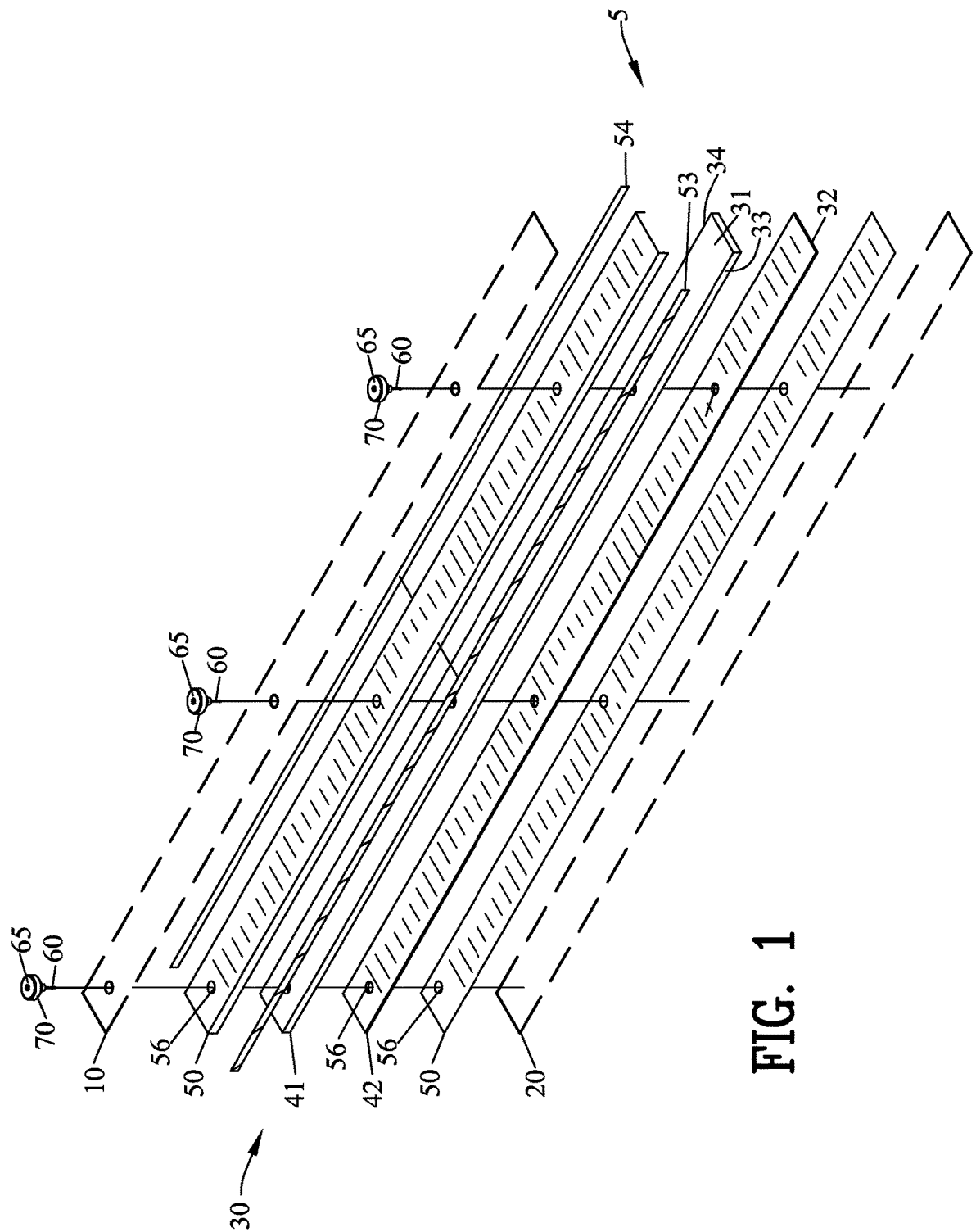
FIG. 1 is an isometric exploded view of the vibration reducing system of the present invention securing a first member to a second member.

FIG. 1 is an isometric exploded view of vibration reducing system 5 of the present invention. The vibration reducing system 5 secures a first member 10 to a second member 20 with reduced vibration transmission. The first and second members 10 and 20 are show as generic members illustrating the wide variety of uses of the present invention. A specific example of the first and second members 10 and 20 is show in FIGS. 11-15.

The vibration reducing system 5 comprises a vibration mat 30 for spacing the first member 10 from the second member 20 and to reduce vibration therebetween. A fastener 60 secures the first member 10 to the second member 20. A resilient member 70 is interposed between the first member 10 and the fastener 60 for reducing vibration between the first member 10 and the second member 20 through the fastener 60.

Figure 2:
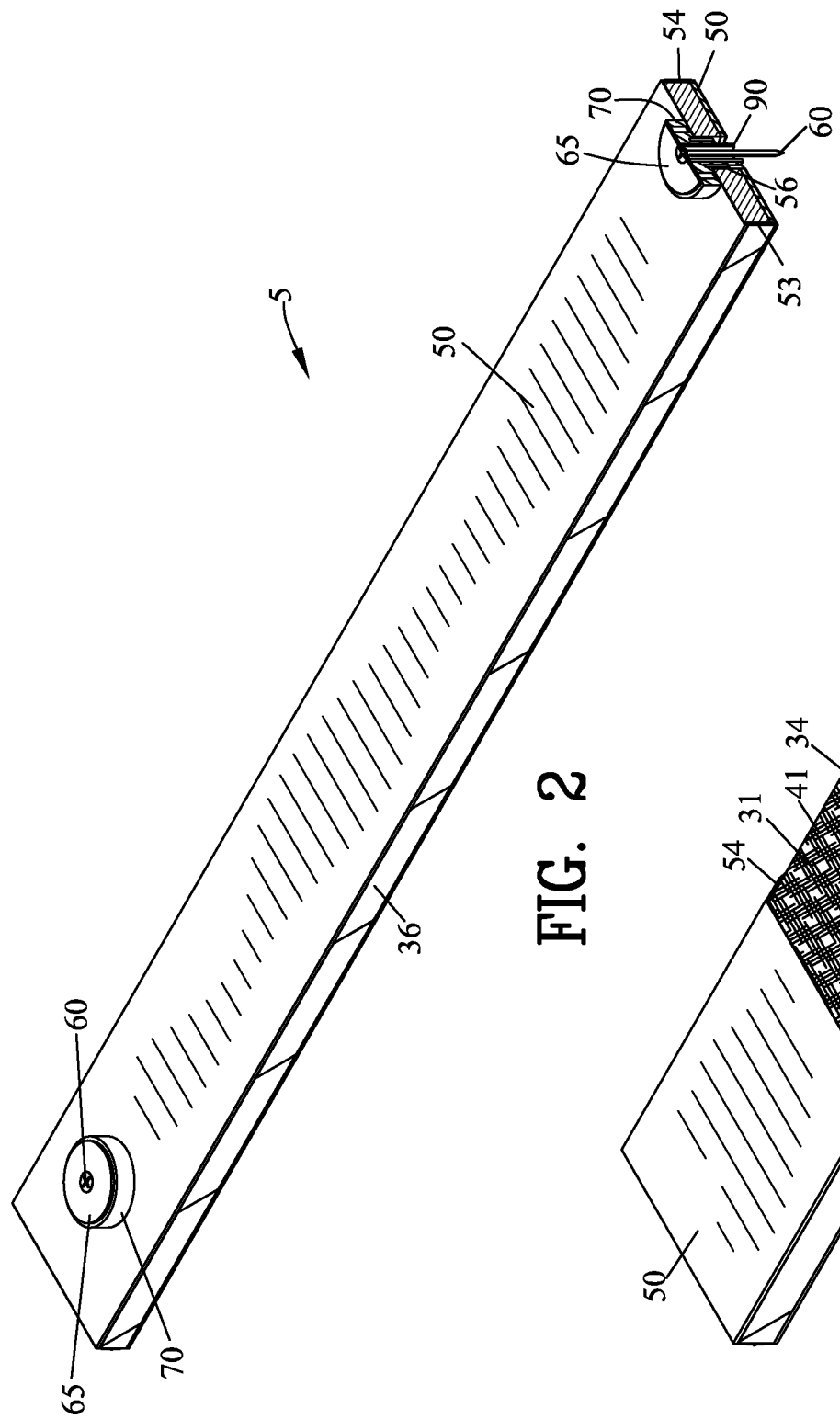
FIG. 2 is an enlarged sectional view of the vibration mat of the vibration reducing system of FIG. 1.
Figure 3:
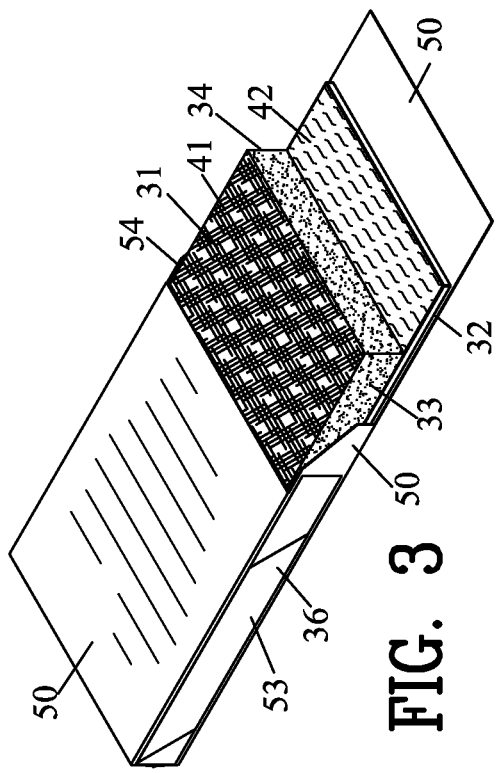
FIG. 3 is a magnified layered view of the vibration mat of FIG. 2.
Figures 4, 5:
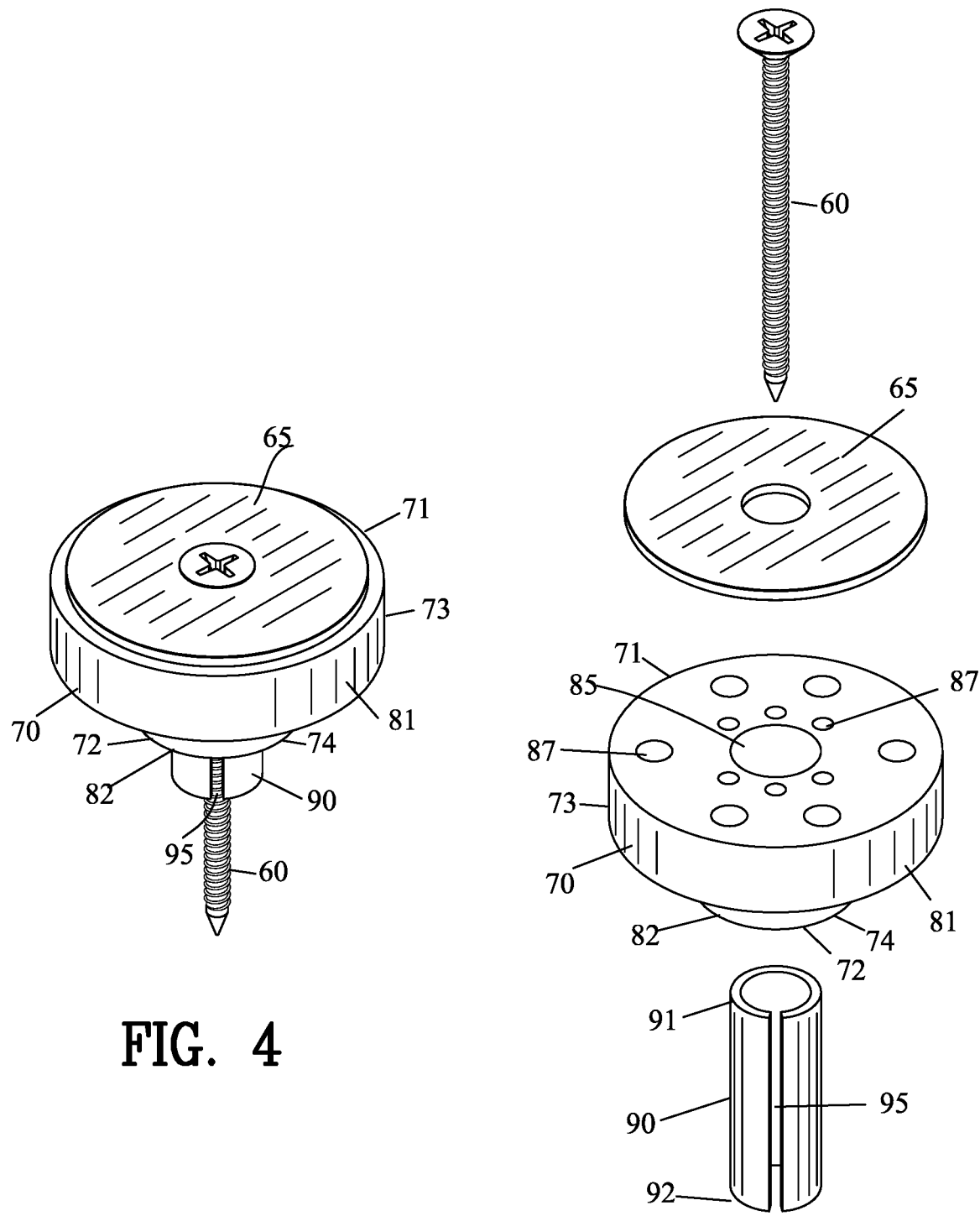
FIG. 4 is an enlarged isometric view of a resilient member of the vibration reducing system of the present invention.
FIG. 5 is an exploded view of FIG. 4.
Figure 7:
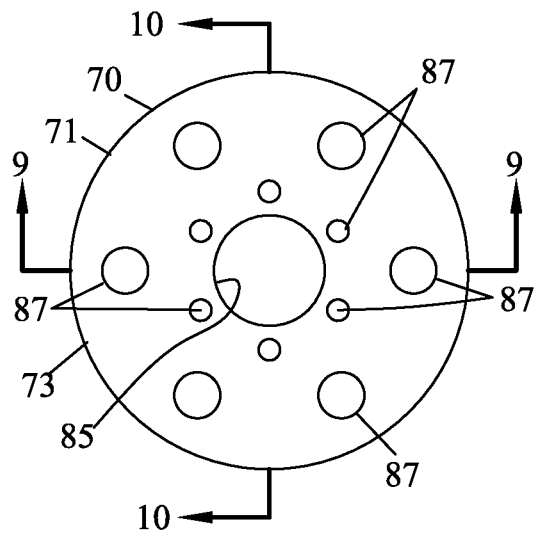
FIG. 7 is a top view of FIG. 6.
Figure 9:
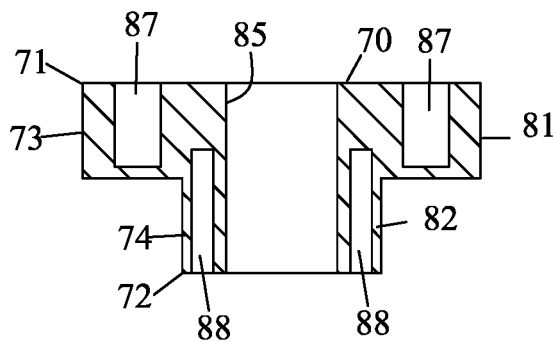
FIG. 9 is a sectional view along line 9-9 in FIG. 7.
Figure 6:
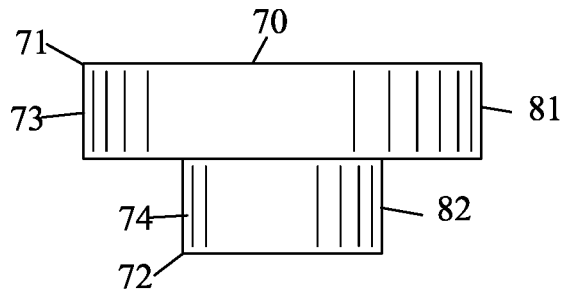
FIG. 6 is a side view of the resilient member of FIGS. 4-5.
Figure 8:
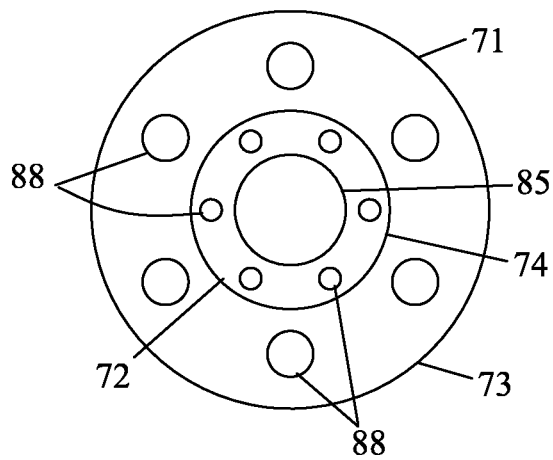
FIG. 8 is a bottom view of FIG. 6.
Figure 10:
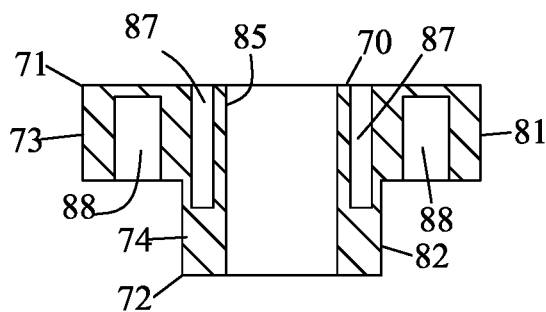
FIG. 10 is a sectional view along line 10-10 in FIG. 7.

FIGS. 2 and 3 further illustrate the vibration mat 30 of FIG. 1. The vibration mat 30 is shown as a longitudinally extend mat having a first side 31 and a second opposing side 32 with a first and a second edge 33 and 34. The vibration mat 30 has an overall thickness 36 of approximately 0.625 inches.

The vibration mat 30 comprises a fiberboard layer 41 adjacent to the first side 31 and a thermal layer 42 adjacent to the second side 32. In one example, the fiberboard layer 41 comprises a high density foam layer 41 having a thickness of approximate thickness of 0.5 inches and having a density of 6 pounds per square foot. The thermal layer 42 comprises an aerogel layer having a thickness of approximately 0.125 inches.

A vapor barrier wrap 50 encases the vibration mat 30. The vapor barrier wrap 50 extends about the first side 31, first edge 33, second side 32 and the second edge 34 of the vibration mat 30. An example of a material suitable for the vapor barrier wrap 50 is polymer film. A first and a second edge protector 53 and 54 are secured over the vapor barrier wrap 50 on the first edge 33 and the second edge 34. The first and second edge protector 53 and 54 protect the exposed first and second edges 33 and 34 of the vibration mat 30. The first side 31 and the second side 32 of the vapor barrier wrap 50 are protected by the first and second members 10 and 20. A vibration mat bore 56 extends through the vibration mat 30.

A complete explanation of the of the vibration mat bore 56 is set forth with reference to FIGS. 14 and 15.

FIGS. 4-10 are enlarged views of the resilient member 70. The resilient member 70 extends between a first and second end 71 and 72. The resilient member 70 is defined by a first diameter 73 adjacent to the first end 71 and having a second diameter 74 adjacent to the second end 72 of the resilient member 70. A shoulder 75 is defined by the intersection of the first diameter 73 and the second diameter 74.

The first diameter 73 has an axial length 81. The second diameter 74 has an axial length 82. The axial length 82 of the second diameter 74 of the resilient member 70 is less than the thickness 36 of the vibration mat 30. A central aperture 85 extends through the resilient member 70 between the first and second ends 71 and 72.

A plurality of first minor holes 87 extend partially through the first diameter 73 from the first end 71. A plurality of second minor holes 88 extend partially through the first diameter 73 toward the first end 71. The plurality of first and second minor holes 87 and 88 increase the resiliency of the resilient member 70. Preferably, the resilient member 70 is molded from a unitary polymeric material such as neoprene or any other suitable material.

A fender washer 65 is positioned adjacent to the first end 71 of the resilient member 70. The fender washer 65 distributes the force of the fastener 60 over the entire surface of the first end 71 as should be well known to those skilled in the art.

A rigid sleeve 90 extends between a first and a second end 91 and 92 and defines a cylindrical sidewall 93. A slit 95 extends between the first and second ends 91 and 92 and through the cylindrical sidewall 93. The rigid sleeve 90 has an axial length substantially equal to the thickness of the vibration mat 36 plus the axial length 81 of the first diameter 73 of the resilient member 70. Preferably, the rigid sleeve 90 is formed from a unitary material such as steel, a polymeric material or any other suitable rigid material.

The rigid sleeve 90 is frictionally retained within the aperture 85 of the resilient member 70 with the second end 92 of the rigid sleeve 90 extending beyond the second end 72 of the resilient member 70. The rigid sleeve 90 inhibits compression of the resilient member 70 as will be described in greater detail hereinafter.

Figure 11:
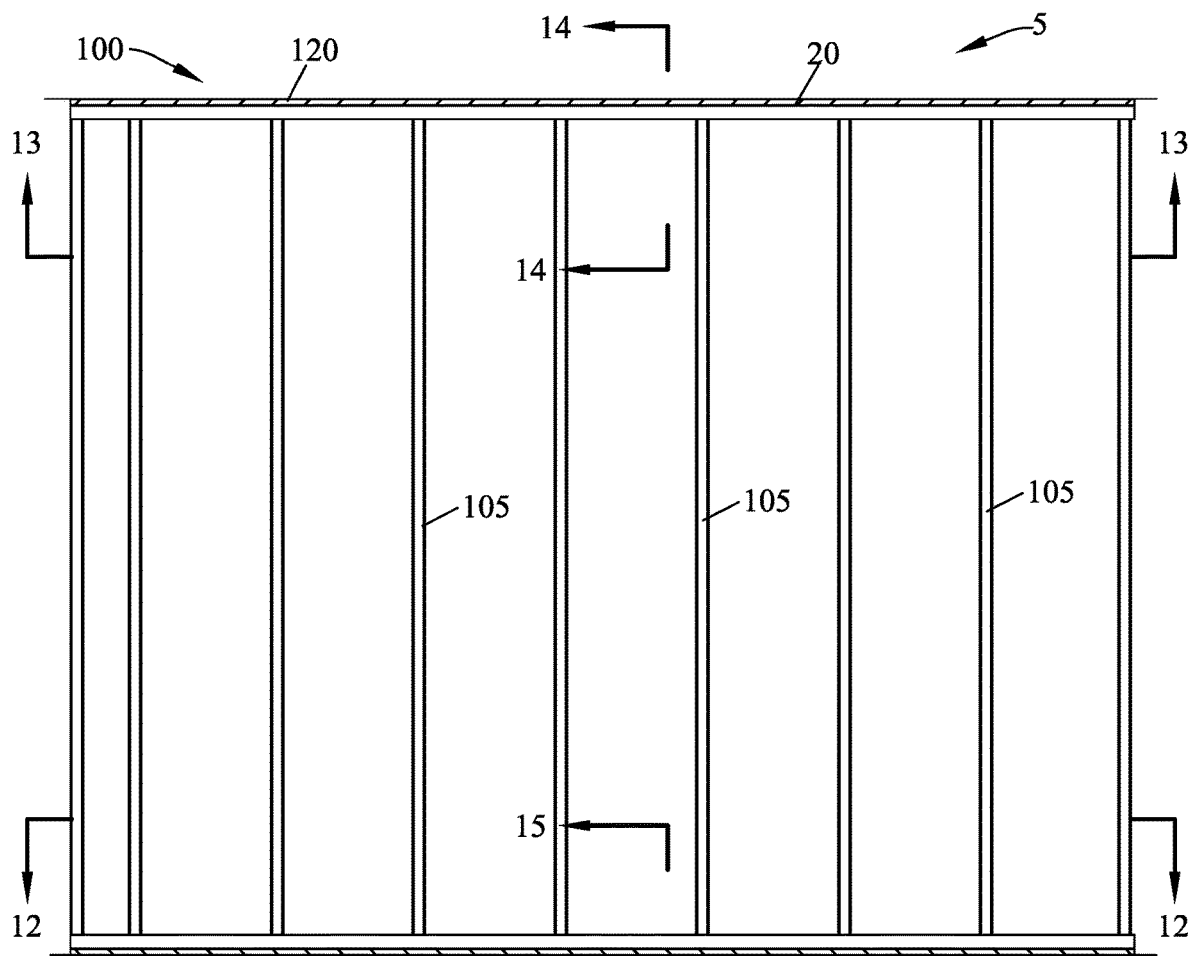
FIG. 11 is an elevational view of a wall incorporating the present invention.
Figure 12:
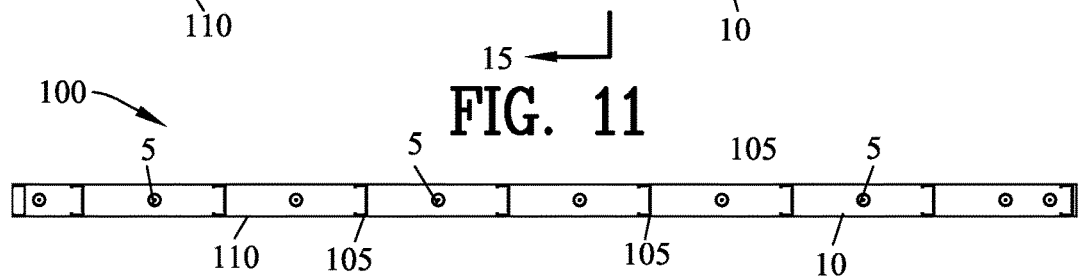
FIG. 12 is a view along line 12-12 of FIG. 11.
Figure 13:
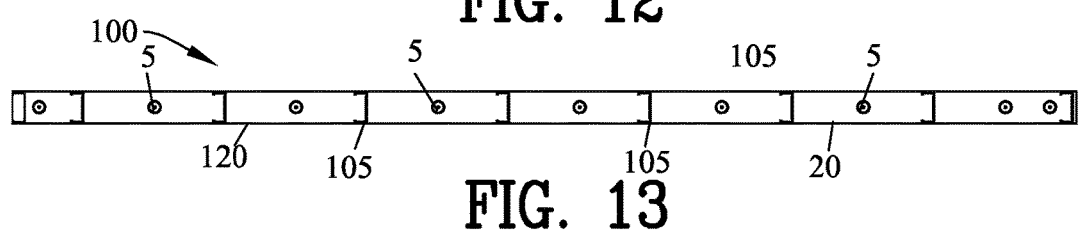
FIG. 13 is a view along line 13-13 of FIG. 11.

FIGS. 11-13 illustrate the vibration reducing system 5 incorporated into a building component. In this example, the building component is shown as a wall 100 of a building structure. The wall 100 comprises a plurality of wall studs 105 supported by a floor support 110 and a ceiling support 120. The floor support 110 and the ceiling support 120 are formed of a material suitable for threadably receiving the fastener 60. The floor support 110 and the ceiling support 120 are representative of the second member 20 in FIG. 1.

The first member 10 comprises metallic building studs for connection to the floor support 110 and the ceiling support 120 by the vibration reducing system 5. The metallic building studs 10 support the plurality of wall studs 105 in a conventional manner as should be well know by those skilled in the art.

Figure 14:
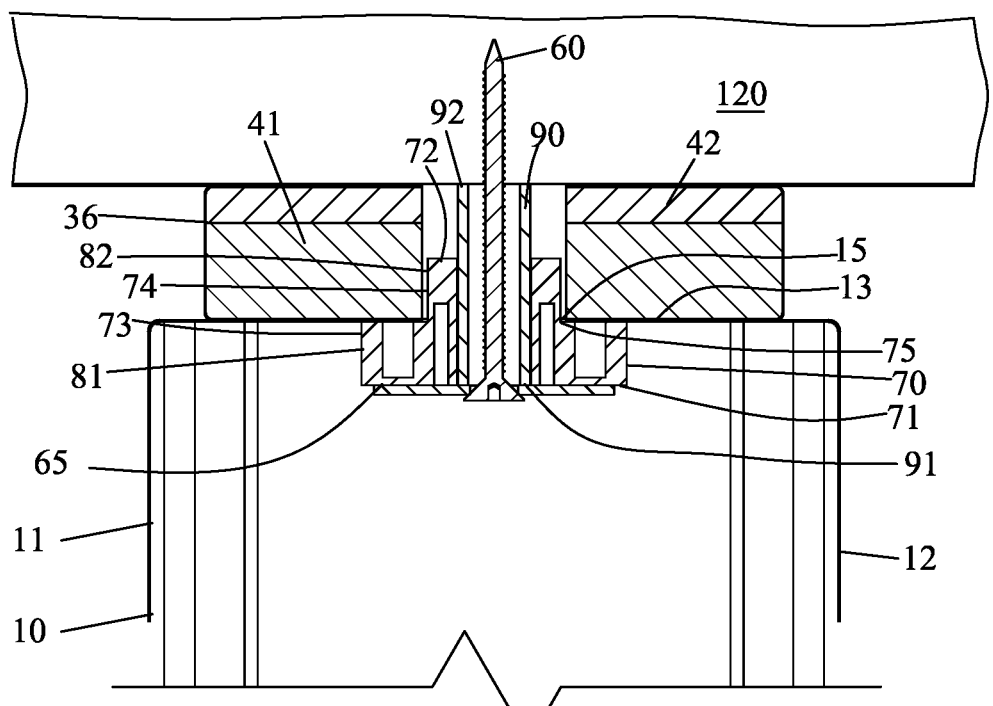
FIG. 14 is an enlarged view along line 14-14 of FIG. 11.
Figure 15:
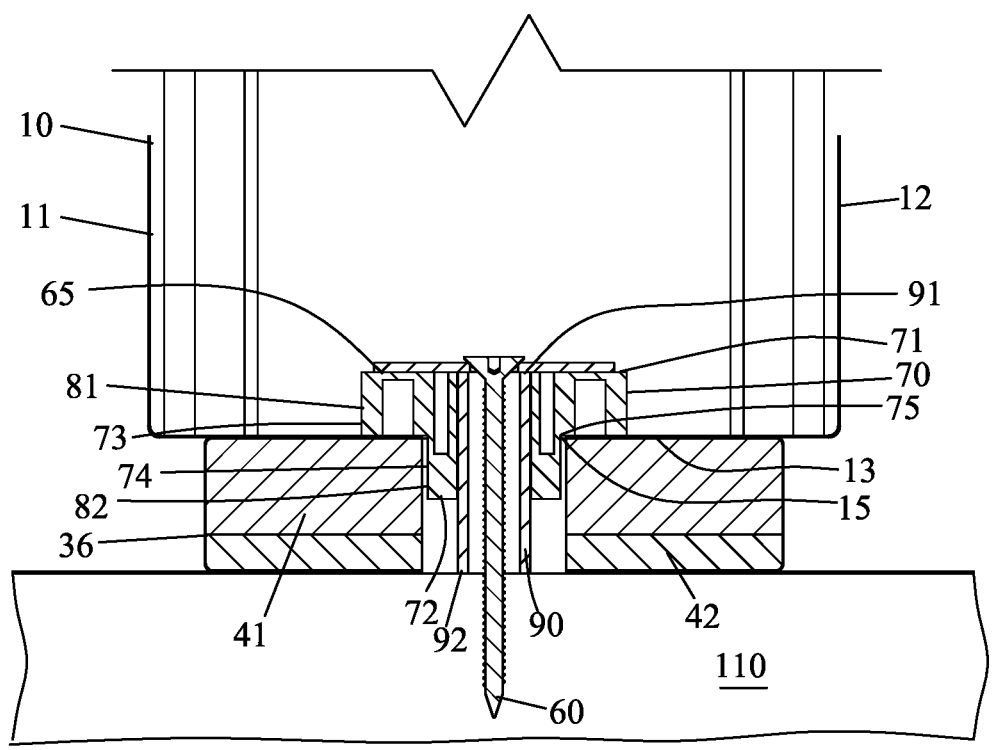
FIG. 15 is a view along line 15-15 of FIG. 11.

FIGS. 14 and 15 are enlarged sectional views illustrating the vibration reducing system 5 connecting the metallic building stud 10 to the floor support 110 and the ceiling support 120. The metallic building stud 10 has plural legs 11 and 12 supported by a central portion 13. The central member 13 includes a through orifice 15 extending through the first member 10.

The first diameter 73 of the resilient member 70 is larger than the through orifice 15 of the first member 10. The second diameter 74 of the resilient member 70 is smaller than the through orifice 15 of the first member 10. The axial length 82 of the second diameter 72 is less than the thickness 36 of the vibration mat 30.

The through orifice 15 of the first member 10 is dimensioned to receive the second diameter 74 of the resilient member 70. The through orifice 15 is dimensioned to be smaller than the first diameter 73 of the resilient member 70 enabling the shoulder 75 to engage the central portion 13 of the metallic building stud 10.

The vibration mat 30 is interposed between the first member 10 and the second member 20 with the vibration mat bore 56 being aligned with the through orifice 15 in the first member 10.

The resilient member 70 is mounted upon the first member 10 with the shoulder 75 engaging the central portion 13 of the first member 10 and with the second diameter 20 being received within the through orifice 15 of the first member 10. The fastener 60 extends through the rigid sleeve 90 for securing the first member 10 to the second member 20. The rigid sleeve 90 limits the compression of the vibration mat 30 and the resilient member 70 by the compression force of the fastener 60.

The present invention provides a vibration reducing system 5 for securing a first member 10 to a second member 20 with reducing vibration transmission. The present invention is suitable for securing a building stud to floor support and/or a ceiling support.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A vibration reducing system for securing a first member to a second member with reducing vibration transmission, comprising:
   a vibration mat comprising an aerogel layer for spacing the first member from the second member and for reducing vibration therebetween;
   a fastener securing the first member to the second member; and
   a resilient member interposed between the first member and the fastener for reducing vibration between the first member and the second member through the fastener.

2. A vibration reducing system for securing a first member to a second member with reducing vibration transmission as set forth m claim 1, wherein said vibration mat includes a high density foam layer.

3. A vibration reducing system for securing a first member to a second member with reducing vibration transmission as set forth in claim 1, wherein said resilient member comprises a neoprene member.

4. A vibration reducing system for securing a first member to a second member with reducing vibration transmission as set forth in claim 1, wherein said resilient member comprises a neoprene member with a fender washer located on remote from the first member.

5. A vibration reducing system for securing a first member to a second member with reducing vibration transmission as set forth in claim 1, including a rigid sleeve comprising a steel member for inhibiting compression of said resilient member.

6. A vibration reducing system for securing a first member to a second member with reducing vibration transmission, the first member having a through orifice, comprising:
   a vibration mat comprising an aerogel layer having a bore extending through said vibration mat;
   a resilient member extending between a first and second end;
   said resilient member defined by a first diameter adjacent to said first end and having a second diameter adjacent to said second end of said resilient member;
   said first diameter being larger than said through orifice of said first member;
   said second diameter being smaller than said through orifice of said first member and having an axial length less than a thickness of said vibration mat;
   an aperture extending through said resilient member between said first and second ends of said resilient member;
   a rigid sleeve disposed within said aperture extending from said first end passed said second end of said resilient member;
   said vibration mat being interposed between the first member and the second member with said bore being aligned with said orifice in said first member and said bore of said vibration mat;
   said resilient member being mounted upon said first member with said first diameter engaging said first member and with said second diameter being received within said through orifice of said first member; and
   a fastener extending through said rigid sleeve for securing said first member to said second member with said rigid sleeve limiting the compression of said vibration mat and said resilient member by said fastener.

7. A vibration reducing system for securing a first member to a second member with reducing vibration transmission as set forth m claim 6, wherein the first member comprises a building component.

8. A vibration reducing system for securing a first member to a second member with reducing vibration transmission as set forth m claim 6, wherein the first member comprises a building plate.

9. A vibration reducing system for securing a first member to a second member with reducing vibration transmission as set forth m claim 6, wherein the first member comprises a metallic building stud.

10. A vibration reducing system for securing a first member to a second member with reducing vibration transmission as set forth in claim 6, wherein the second member comprises a member suitable for threadably receiving a threaded fastener.

11. A vibration reducing system for securing a first member to a second member with reducing vibration transmission as set forth m claim 6, wherein said vibration mat includes a high density foam layer.

12. A vibration reducing system for securing a first member to a second member with reducing vibration transmission as set forth in claim 6, wherein said resilient member comprises a neoprene member.

13. A vibration reducing system for securing a first member to a second member with reducing vibration transmission as set forth in claim 6, wherein said resilient member comprises a neoprene member with a fender washer located on said first end of said resilient member.

14. A vibration reducing system for securing a first member to a second member with reducing vibration transmission as set forth m claim 6, wherein said rigid sleeve comprises a steel member for inhibiting compression of said resilient member.

\* \* \* \* \*